Oct. 19, 1937.  A. GUERBILSKY  2,096,106
METHOD AND APPARATUS FOR TRANSFORMING PRESSURE
VARIATIONS INTO ELECTRICAL VARIATIONS
Filed May 16, 1933  4 Sheets-Sheet 1

Inventor:-
Alexis Guerbilsky
by Browne & Seward
attorneys

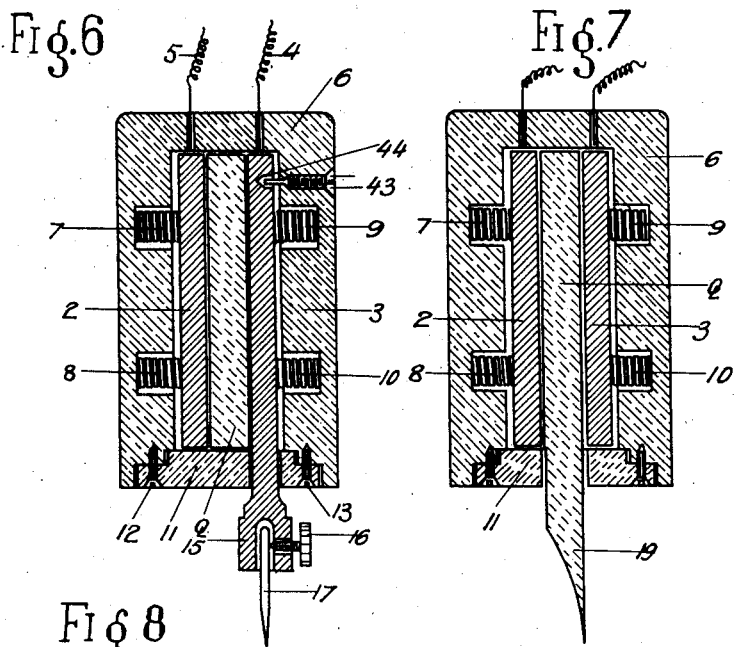
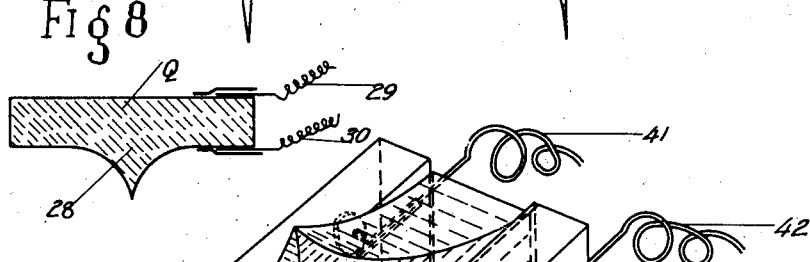
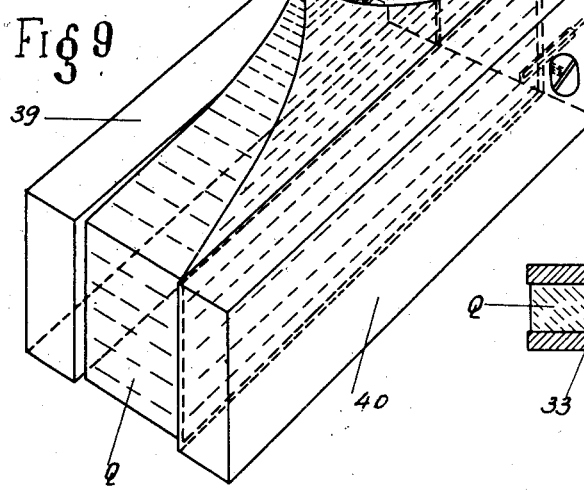
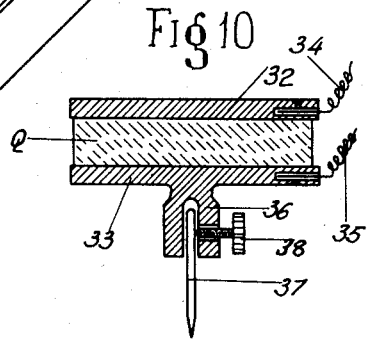

Inventor:-
Alexis Guerbilsky
by Brown + Seward
attorneys

Patented Oct. 19, 1937

2,096,106

UNITED STATES PATENT OFFICE 2,096,106

METHOD AND APPARATUS FOR TRANSFORMING PRESSURE VARIATIONS INTO ELECTRICAL VARIATIONS

Alexis Guerbilsky, Paris, France

Application May 16, 1933, Serial No. 671,327
In Belgium May 18, 1932

4 Claims. (Cl. 179—100.4)

My invention relates to methods and apparatus in which pressure variations are transformed into electric variations, either for measurement, observation, or recording purposes, or in order to operate certain apparatus responsive to said pressure variations.

The chief object of my invention is to provide a method and apparatus of the kind above referred to by means of which the variations of pressure are transformed into variations of an electric current permitting accurate measurement, observation, or recording of the pressure, or efficient action on the apparatus to be controlled by said pressure.

To this effect, according to my invention, I dispose a piezo-electric crystal, or equivalent device, in the field produced by an electric current tuned to resonance with the crystal, so that said crystal, or equivalent device vibrates, and I then apply to one or several faces of said crystal the pressure that is to be measured, observed, or recorded, or that is to control the operation of a given apparatus. I then utilize the variations that take place in the current of said circuit or of another circuit coupled with the crystal or equivalent device in consequence of the variations of the pressure, either directly or indirectly, for measuring, observing, or recording said variations of pressure, or for operating the apparatus that is to work in accordance with said variations of pressure.

The piezo-electric crystal may be mounted in different ways in the electric circuit. For instance, according to an embodiment of my invention, it is so arranged as to be able to absorb, when it is set in vibration, a certain portion of the energy of the circuit in which it is inserted. In this way, when the vibratory conditions of the crystal are modified, as a consequence of a variation of the pressure to which it is subjected, the portion of the energy of the circuit that is absorbed by the vibration of the crystal varies, and therefore the energy available in the circuit also varies. It suffices to utilize the variations of current that are thus produced, through any suitable methods, such, for instance, as are already known to those skilled in the art for this purpose, for measuring, observing, or recording the variations of pressure, or again for controlling certain apparatus that are to work responsive to said variations of pressure.

The crystal may also, according to another embodiment of my invention, be mounted in the circuit in such manner as to sustain or stabilize the current oscillations so that the variations of pressure to which the crystal is subjected produce modifications of these oscillations. These modifications are then utilized for measuring, observing, etc., the variations of pressure.

It will be noted that in both cases the crystal is utilized in such manner as to act on the current in a circuit so as to modify the characteristics of said current. This method permits, on the one hand to obtain measurements that are very accurate, and on the other hand to set in operation quantities of electricity that are relatively large so that the actions or measurements that are obtained can be utilized easily for practical purposes. This is different from what takes place in existing piezo-electric dynamometers in which the pressures are measured by the electric charge produced by the piezo-electric crystal as a result of its being compressed or expanded. This charge is always very small and is very difficult to measure. Furthermore, when it is desired to measure a continuous pressure, the charge produced as a result of said pressure does not remain, due to the impossibility of obtaining a perfect insulation, which makes measurements still more difficult.

Another object of my invention is to provide a microphone working on the principle above explained and in which the pressures that act on the piezo-electric crystal are produced by the sound waves.

Still another object of my invention is to provide a device for reproducing sounds recorded on a phonographic disc or any other sound record, this device forming a pick-up in which the pressures that are intended to operate the sound reproducing system are produced by the displacement of the needle of the pick-up in the groove of a phonographic record.

This device essentially comprises a piezo-electric crystal (preferably quartz) adapted to vibrate in an electric circuit tuned to resonance with the natural frequency of the crystal. The piezo-electric crystal is placed and arranged in such manner that its surface is subjected to variations of pressure when the needle of the pick-up runs in the groove of the phonographic record. These variations of pressure have for their effect to damp the vibrations of the crystal and therefore to produce certain electric effects. The crystal that is used will preferably be of a thickness that varies over its surface so as to resonate for a frequency band corresponding at least to twice the frequency band to be reproduced.

The sound reproducing device according to my invention can be utilized not only with records provided with grooves but also with any other system for operating the pick-up either mechanically or magnetically or in any other suitable way.

My invention is also intended to be applied to aerodynamic balances or dynamometers, to accelerometers especially adapted to be used in connection with airplanes, to apparatus for receiving electro-sonorous waves, etc.

Another object of my invention is to provide a piezo-electric crystal that is capable of vibrating at frequencies ranging between relatively wide limits. It is well known that an ordinary piezo-electric crystal is capable of vibrating only at frequencies equal, or nearly equal, to its natural frequency of vibration. This is of course rather a hindrance for the working of the method and apparatus above referred to. It is a source of still greater difficulty in the case of a piezo-electric crystal used for recording sounds on a film through the so-called "variable density" method. In this case, the crystal through which passes the light beam that is to sensitize the film is inserted in a high frequency alternating field adapted to cause said crystal to resonate. The intensity of the high frequency field is modulated at low frequency in accordance with the intensities of the sounds to be recorded so that the resulting variations in the amplitude of vibration of the crystal may modulate accordingly the intensity of the light beam that passes therethrough. It is known that in this case the fixed high frequency is replaced by a frequency band, due to side frequencies, so that, in order to obtain a good result, the crystal should be capable of vibrating for a frequency band, which is not the case for an ordinary piezo-electric crystal.

In order to avoid this drawback, according to my invention, the crystal is cut in such manner that it comprises zones or series of zones, capable of being set in resonance vibration for all the frequencies included in the frequency band that is considered.

For instance, according to an embodiment of my invention, the piezo-electric crystal consists of a prism having two opposite faces inclined with respect to each other and transversally disposed (substantially at right angles) to the electric field, the direction of the light rays being located in a plane substantially at right angles to said two faces between said two faces.

These and other objects of my invention will be hereinafter disclosed in the following detailed description of preferred embodiments of my invention with reference to the accompanying drawings, given merely by way of example, and in which:

Fig. 6 is a vertical sectional view of a pick-up according to my invention;

Fig. 7 is a similar view of another embodiment of a pick-up according to my invention;

Fig. 8 is a piezo-electric crystal cut in such manner as to form the needle of a pick-up according to my invention;

Fig. 9 is a perspective view of another piezo-electric crystal adapted to form the needle of a pick-up;

Fig. 10 is a sectional view of another embodiment of a pick-up according to my invention;

Figure 1:
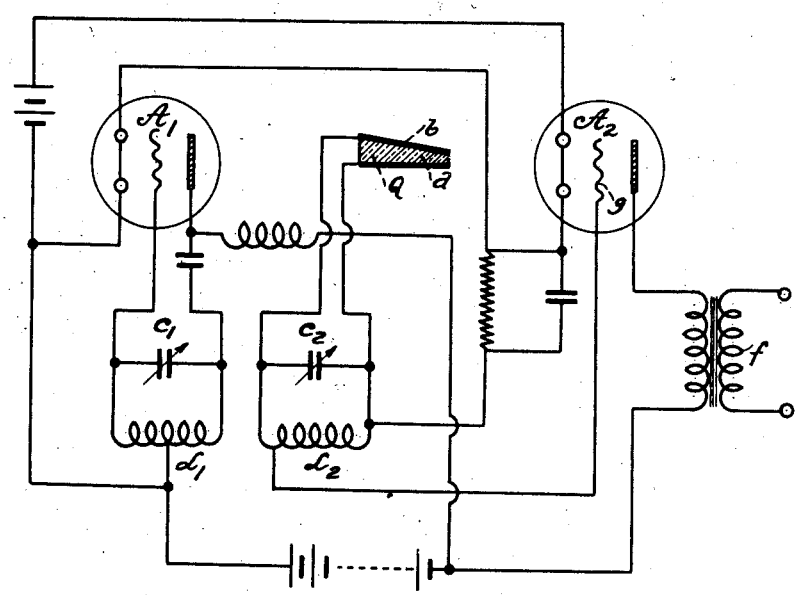
Fig. 1 is a diagrammatical view showing a device according to my invention in which the crystal absorbs a portion of the energy of an electric circuit.

Referring to Fig. 1, it will be seen that the oscillatory circuit consists of a reactance coil $L^1$ and an adjustable condenser $C^1$, the oscillations in said circuit being set up by a three-electrode tube $A^1$. The current in this circuit produces inductively an oscillating current in the second circuit adapted to be tuned to resonance therewith and consisting of a reactance coil $L^2$ and an adjustable condenser $C^2$. A condenser consisting of a piezo-electric crystal Q (preferably quartz), placed between two armatures $b$ and $d$, is connected to the terminals of inductance coil $L^2$.

Coil $L^2$, or at least a portion thereof, is placed in the grid circuit of detector tube $A^2$. When condensers $C^1$ and $C^2$ are adjusted in such manner that the two above described circuits are tuned to resonance with each other so that crystal Q vibrates, a certain amount of the energy in the circuit of coil $L^2$ is absorbed by said vibrations. The pressure to be measured is applied to opposite faces of said crystal, and when said pressure varies, the amount of energy absorbed by the crystal is varied and consequently the mean potential of grid $g$ and tube $A^2$ is varied. This produces a variation of the plate current of said detector tube $A^2$ which may be utilized in various ways which will be hereinafter described for measuring, observing, or recording the pressures acting on crystal Q, or for operating certain apparatus in accordance with variations of said pressure.

Figure 2:
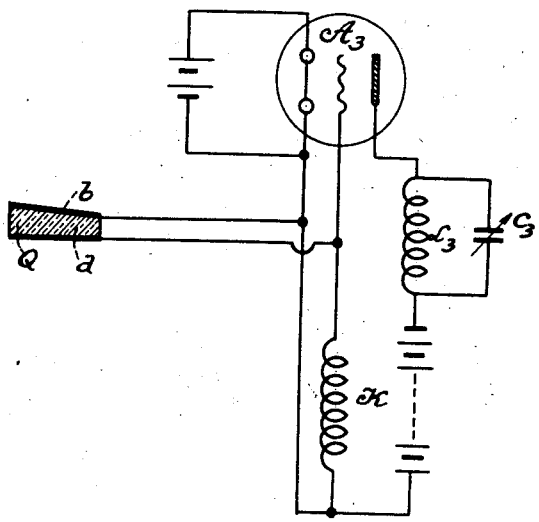
Fig. 2 shows another embodiment in which the crystal maintains the electric oscillations in a circuit.

In the embodiment of Fig. 2, a piezo-electric crystal is inserted in an electric circuit so as to sustain or stabilize the oscillations of current in said circuit.

This arrangement comprises a three-electrode electron tube $A^3$, to the plate circuit of which there is connected a battery and an oscillatory circuit including a reactance coil $L^3$ and an adjustable condenser $C^3$. The grid circuit includes a condenser consisting of a piezo-electric crystal Q mounted between two armatures $b$ and $d$. The proper negative bias is applied to the grid through a choke coil K.

The arrangement described and illustrated in Fig. 2 is a well known arrangement and can be replaced by any other suitable arrangement, the function of condenser $b$, $q$ and $d$ being to sustain high frequency oscillations and the circuit $L^3$, $C^3$. When the piezo-electric crystal Q is subjected to a certain pressure, the current in reactance coil $L^3$ varies. These variations can be utilized either for measuring, recording, or observing the pressure, or for controlling the working of any desired apparatus.

It will be noted that, in both of the arrangements above described, crystal Q has non-parallel opposite faces, for reasons that will be hereinafter explained. However, it should be well understood that this is not a necessary feature of my invention.

On the other hand, the support and the armatures of the crystal may be given any suitable shape and arrangement without departing from the principle of my invention. The armatures may for instance consist of metallic plates or coatings deposited on the surface of the crystal, which may, for instance be silvered. Alternately, the crystal might be rigidly connected to another body, for instance a relatively thick metal plate directly subjected to the variations of pressure.

The variations of the high frequency current that are obtained as a consequence of the variations of pressure on one or more faces of the crystal may be utilized either directly or after detection. Thus, for instance, high frequency currents the amplitudes of which vary at low frequency, as it is the case in a microphone or a pick-up, can be utilized directly, without detection. In this case said high frequency currents may be directly utilized for emitting electro-magnet waves. Such a device would be constituted by the arrangement of Fig. 2 in which an antenna would be coupled with coil $L^3$.

On the other hand, high frequency currents the amplitudes of which vary at low frequency, as in a microphone or a pick-up, may be caused to act on a detector, the current that is utilized being then the detected current.

It should also be well understood that the detector is not necessarily a three-electrode electron tube. For instance, in the circuits above described, the three electrode tube might be replaced by a diode tube or any other equivalent device. By way of example, a Philips "binode" tube might be substituted for the three electrode tube.

In a general way, any circuit, or combination of circuits, that is capable of setting the piezoelectric crystal in vibration so that variations in the characteristics of an electric current are produced in consequence of variations of pressure exerted on the crystal can be utilized according to my invention, the examples above described having been given merely by way of example.

Figure 3:
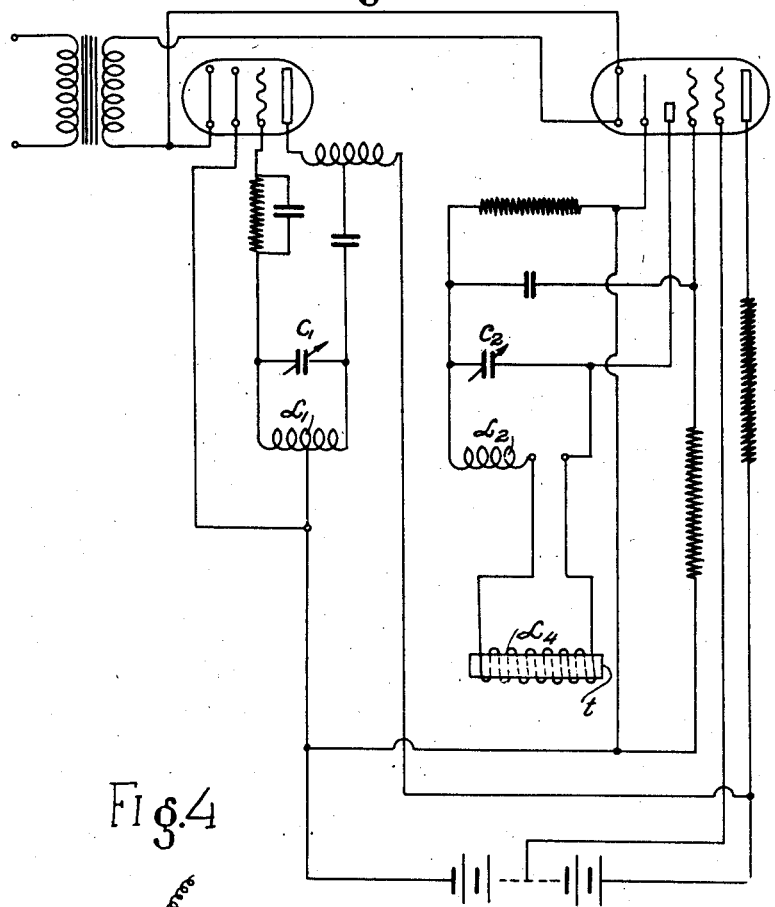
Fig. 3 is a diagrammatical view of still another embodiment of the device according to my invention.

Besides, the resonating element subjected to the action of a pressure to be measured, observed, or recorded or intended to control the working of a given apparatus is not necessarily a piezoelectric crystal. It may, for instance, according to my invention, consist of a magneto-striction device, as shown in Fig. 3. The circuit shown in this figure is similar to that of Fig. 1. However, the piezo-electric crystal is done away with and a coil $L^4$ is connected in series with reactance coil $L^2$. A magnetic core $t$ is placed in the magnetic field and the pressure to be measured, observed, or recorded or intended to control the working of a given apparatus is applied to said core $t$.

It will be noted that in Fig. 3, I have replaced the three electrode tube $A^2$ of the embodiment of Fig. 1 by a Philips "binode" tube of a known type, in order to show that the examples given are subject to many modifications without departing from the principle of my invention.

Figure 4:
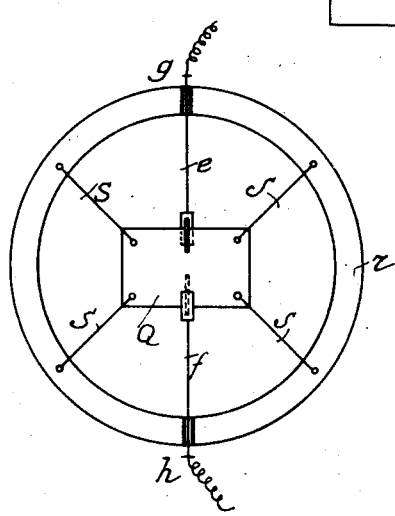
Fig. 4 is a front view of a microphone according to my invention.
Figure 5:
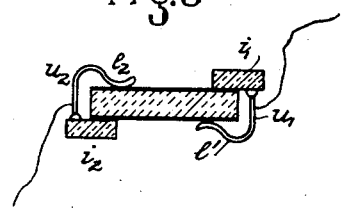
Fig. 5 is a view of the piezo-electric crystal used in said microphone.

In Figs. 4 and 5, I have shown a microphone according to my invention. It comprises a rigid ring $r$, made for instance of metal, to which a piezo-electric crystal Q (quartz preferably) is elastically connected in a central position, for instance by means of four springs $s$. The opposite faces of crystal Q that are located in planes substantially parallel to the plane of ring $r$ are provided with metallic armatures, for instance thin coatings of silver or any other suitable metal. Two clips $u^1$ $u^2$ each comprising a metallic branch ($l^1$ $l^2$ respectively) and an insulating branch ($i^1$, $i^2$ respectively) are fixed to said crystal Q in such manner that metallic branch $l^1$ is in contact with one of the silvered faces of the crystal while the other one $l^2$ is in contact with the other silvered face of the crystal. These branches $l^1$ $l^2$ are connected through wires $e$ $f$ respectively to terminals $g$ $h$ which are connected to a suitable circuit such as the one shown in either of Figs. 1 and 2 in the same manner as armatures $b$ and $d$ in said figures.

It should be noted that the microphone that has just been described is particularly advantageous in that it is symmetrical and both of its faces are operative.

I will now describe examples of pick-ups according to my invention.

Adverting first to Fig. 6, a piezo-electric crystal Q is placed between two armatures 2 and 3, connected by means of lead wires 4 and 5 with a suitable electric circuit for instance of one of the types above described. The whole is placed in a support 6. The two armatures 2 and 3 are applied against the surface of the crystal by springs 7, 8, 9 and 10 placed in housings provided in support 6, in such manner as to elastically apply the armatures against the faces of the crystal.

Support 6 is closed at its lower part by an insulating lid 11 fixed for instance by means of screws 12 and 13. This lid is provided with an aperture 14 through which passes armature 3, the lower part of which projects from the lid and acts as a support 15 for the needle 16, which is clamped in the support in the usual way by means of a screw 17.

When needle 16 runs in the groove of the record, the armature 3 which is elastically applied against the face of crystal 1, exerts on the latter a pressure that varies according to the shape of the groove, and the amplitude of the vibrations of the crystal varies accordingly, thus producing electric variations in the circuit to which crystal Q is connected through wires 4 and 5.

In the example of Fig. 7, support 6, is made in the same manner as in the preceding embodiment. However, in this case, independent needle 16 is dispensed with and is replaced by the crystal itself the lower part of which is cut in such manner as to form a point 19 adapted to run in the grooves of the phonographic record. Crystal Q is placed, as in the preceding example, between two armatures 2 and 3, which are elastically applied against its faces by springs 7, 8, 9, 10. Support 6 is closed by lid 11 provided with an opening through which passes the point 19 of crystal Q.

In this embodiment of my invention, when the extremity 19 of the crystal runs in the groove, the pressure that is exerted on the crystal varies and produces the desired effects.

In the example of Fig. 8, the crystal, instead of being placed in a direction substantially at right angles to the surface of the record that is provided with grooves, is disposed in a direction substantially parallel to said surface.

It should be well understood that with such an arrangement of the crystal, the needle may be either independent as shown in Fig. 6 and as it will be hereinafter explained, or it may be cut in the mass of crystal Q, thus consisting of a point 28 adapted to run in the grooves of the record.

In the example of Fig. 8, the faces of the crystal are coated with metal so as to form armatures which are connected through wires 29 and 30 to the circuit in which is inserted the crystal.

In the example of Fig. 10, the crystal is disposed parallelly to the surface of the record provided with grooves. However, in this example, the armatures, instead of consisting of metallic coatings deposited on the faces of the crystal, consist of metallic plates 32 and 33 connected to the circuit through wires 34 and 35. The lower plate 33 forms a support 36 for an independent needle 37 fixed in said support, in the usual way, by means of a screw 38.

Fig. 9 is a perspective view of a crystal similar to that shown in Fig. 3 and a portion of which forms the needle. However, in this example, crystal Q instead of having its faces coated with metal, is placed between two armatures 39 and 40 connected to the circuit through wires 41 and 42.

It should be well understood that the examples that have just been described and illustrated only show some possible embodiments of the device according to my invention.

A great number of other embodiments may be devised according to my invention, the crystal, the armatures, the mounting, the support, etc., being suitably modified without departing from the spirit of my invention.

On the other hand, the needle, which as above stated, may either consist of a portion of the crystal itself, or be an independent part, may also in the second case, act on the crystal in any suitable way. Thus, for instance, instead of being carried by an armature applied against the face of the crystal, as it has been shown and illustrated, it may act on the crystal indirectly through any suitable transmission.

Finally, I may utilize the variations of the pressure applied to the vibrating crystal not for modifying the electric circuit that produces said vibration but directly, in view of the fact that there exists a surface (that of the crystal) vibrating at high frequency with a modulation of low frequency. For instance, said surface may be mechanically connected to the membrane of any ordinary microphone. In this case, the microphone current may be of high frequency modulated at low frequency. In some cases due to the inertia of the membrane, only the low frequency current would subsist for practical purposes.

The membrane in question might consist of one of the faces of the crystal itself. An example of an embodiment of this side of our invention would be the following:

One of the faces of the crystal will be connected to a plate of carbon or might be covered itself with a layer of graphite, and placed in contact with particles of carbon. I would thus constitute a microphone of the well known carbon type working on the principle of my invention. One of the faces of the crystal may also constitute one of the armatures of an electro-static microphone.

The support of the crystal may be given any suitable shape. It may for instance, contain the tuning circuit of the crystal. In this case, this support may be completely closed, and the outer connecting wires may be completely dispensed with.

A third interesting application of my invention consists in aerodynamic balances or dynamometers in which the element that is subjected to the pressure or to the variations of pressure, is a piezo-electric crystal working on the principle above described.

Another application of my invention consists in an accelerometer applicable more especially to airplanes and in which the organ responsive to accelerations includes a piezo-electric crystal working on the principle above described. This latter apparatus would preferably be combined with a device for recording the maximums or minimums.

Another application of my invention is to barometers.

The method according to my invention might also be applied to ultra-audible wave receiving apparatus in which the piezo-electric crystal acting according to the process above described acts as a receiver, or both as a receiver and a transmitter of the ultra-audible waves. These apparatus are more particularly utilized in water, for instance for soundings.

In any of the above described embodiments of my invention, the piezo-electric crystal, which preferably consists of a piezo-electric quartz, may be of various shapes and arrangements. Thus, said crystal may, contrary to what is shown in the drawings, have parallel opposite faces. Further, I have found that in view of the fact that a piezo-electric crystal of uniform thickness is capable of vibrating only at its natural frequency, it is preferable to use crystals having a thickness that varies along their surface so that there is always a thickness of the crystal that corresponds to any desired frequency within a certain band of frequencies. In this way, the vibrations of a crystal can be much more easily modulated as already explained by me with reference to other applications of piezo-electric crystals in my French Patents No. 644,240, 696,817, 711,661, 726,850. I may also utilize a crystal cut in the usual way for radio-electric applications.

On the other hand, the pressure may be exerted on different faces of the crystal. I may for instance, cause the quartz to vibrate in a direction at right angles to the electric and optical axes and exert the pressure on a face at right angles to said direction.

The variation of the thickness along the whole surface of the crystal may differ according as the case may be. Thus, in the case for instance of pressures that vary very rapidly, I may cut the crystal in such manner that the frequency band within which the crystal can resonate, may be equal at least to twice the band of frequencies to be observed, measured or utilized for controlling certain apparatus. On the other hand, the thickness may be distributed in a particular way in some special cases. Thus, in the case for instance of modulated pressures, if it is desired to favourize high frequencies of modulation, it may be arranged that the parts of a thickness that is most different from the thickness corresponding to the frequency of vibration in the absence of a modulation, may be the greater as the difference between the given thickness and that corresponding to said frequency in the absence of a modulation, is greater.

In Figs. 11 to 14, I have shown some examples of piezo-electric crystals (quartz) adapted to vibrate for a whole band of frequencies.

These crystals shall consist for instance (Fig. 11) of a plate of quartz cut in the shape of a prism having a trapezoidal base, either rectilinear or curvilinear, the thicknesses $u$ and $v$ (that is to say the lengths of the bases of the trapezoid that forms one of the bases of the prism) differing from each other by a value that depends on the two maximum and minimum frequencies for which the crystal must be capable of resonating.

As already explained, the provision of a crystal adapted to vibrate for a whole band of frequencies is particularly necessary when the crystal serves to modulate a light beam responsive to variations of the field in which it vibrates. In this case, it is important that the light beam should be parallel to arrow F. The direction of the field is shown by arrow G.

Figure 11:
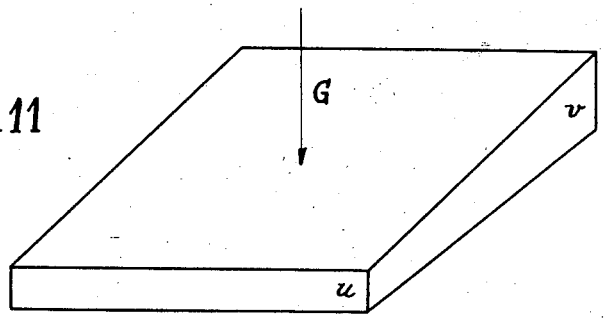
Fig. 11 is a perspective view of a piezo-electric crystal according to my invention.

In a thin piezo-electric plate having its faces slightly inclined with respect to each other and vibrating in the direction of its thickness, that is to say in the direction of edges $u$ and $v$ in a crystal as shown in Fig. 11, there sometimes exists a certain zone of localized vibrations resulting from the propagation of waves in the direction $u$ and $v$.

Figure 12:
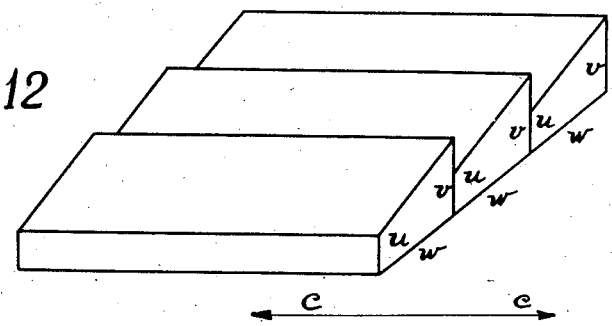
Fig. 12 is a perspective view of another embodiment of the piezo-electric crystal.

In the application of the crystals according to the present invention, this feature might have a detrimental effect in some cases. It is possible to avoid this drawback by making use as shown in Fig. 12, instead of a single plate of a series of identical plates disposed side by side, and cut in such manner as to resonate for the same band of frequencies as the single plate of Fig. 1. The width $w$ of each plate, will be sufficiently small in order that the propagation of waves in the direction $u$—$v$ may have no detrimental effect. The optical axis will be chosen, for instance, parallel to the direction $c$—$c$.

Figure 13:
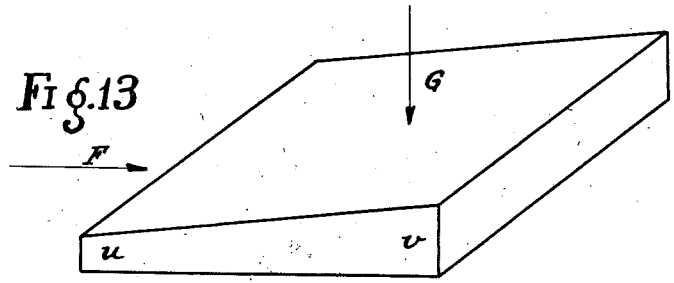
Fig. 13 is a perspective view of still another embodiment of the piezo-electric crystal similar to that of Fig. 3, but with its optical axis disposed in a different manner.

It is also possible to utilize a single prism, as shown in Fig. 13, by so disposing it that the direction of the light beam is parallel with the optical axis of the crystal.

Figure 14:
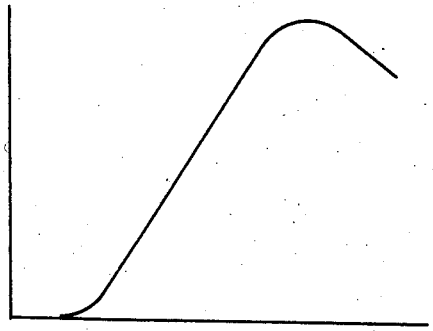
Fig. 14 is a curve illustrating the phenomenons that occur in the crystal of Figs. 11, 12 and 13.

The curve of Fig. 14 shows the quantity of light that is restored as a function of the amplitude of the field through the quartz. This curve comprises an important rectilinear part.

The mean working zone will be chosen, according to my invention, in the central portion of this straight part of the curve.

On the other hand, photographic emulsions also possess a sensitiveness that varies linearly as a function of the illumination between two limits depending on the nature of these emulsions. The modification of the light intensity emitted by the source or the absorption of a certain amount of light energy by suitable screens, will make it possible to work in the most favourable zone.

Through suitable optical means, the parallel beam issuing from the analyzer is concentrated in such manner as to obtain a line, that is the finer as it is desired to lose none of the advantages of the method according to the invention for recording very high frequencies.

On the other hand, being given the great transparency in the ultra-violet zone of the whole electro-optical device (modulator, compensator, polarizer and analyzer) it is interesting to make the remainder of the optical system of a material that is very much transparent to these rays (quartz, fluorine, etc.).

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A device for transforming pressure variations into electric variations, which comprises a magnetic core, a high frequency electric circuit for producing a magnetic field adapted to act on said core so that said core is caused to undergo high frequency vibratory changes of dimension through a magnetostriction action, and means for applying variations of pressure to said core so as to act on the amplitude of the vibration thereof whereby electric variations are produced in said electric circuit.

2. A pick-up for reproducing sounds from a phonographic record which comprises in combination, a piezo-electric crystal, two armatures located on either side of said crystal, means for applying said armatures against said crystal, an electric circuit for generating high frequency electric current coupled with said crystal and tuned to resonance therewith so that the crystal is caused to vibrate at high frequency, the end of said crystal being cut in the shape of a needle so as to cooperate with said record for transmitting thereto variations of pressure from said record.

3. An electric circuit for generating high frequency electric current, comprising a piezo-electric crystal, said crystal being adapted to control the frequency of said current, the dimension of the crystal in the direction in which it resonates being non-uniform so as to make the crystal resonant for a band of frequencies and the frequency of the current being included within the band for which the crystal is resonant.

4. A device for transforming pressure variations into electric variations which comprises a piezo-electric crystal resonant for a band of frequencies, an electric circuit for generating high frequency electric current coupled with said crystal and tuned to oscillate at a frequency within said band, so that the crystal is caused to vibrate at high frequency, and means for applying variations of pressure to said crystal so as to act on the amplitude of the vibrations thereof whereby electric variations are produced in said electric circuit, the dimension of the crystal in the direction in which it vibrates being non-uniform along the surface of said crystal.

ALEXIS GUERBILSKY.